United States Patent Office 3,256,209
Patented June 14, 1966

3,256,209
METHOD OF PREPARING A ZINC OXIDE-SILVER DICHROMATE CATALYST
Vernon V. Young, Terre Haute, Ind., assignor to Commercial Solvents Corporation, New York, N.Y., a corporation of Maryland
No Drawing. Original application Dec. 18, 1961, Ser. No. 160,299. Divided and this application Dec. 31, 1963, Ser. No. 343,429
8 Claims. (Cl. 252—468)

This application is a division of my application Serial No. 160,299, filed December 18, 1961, now abandoned, entitled "Process for the Production of Oximes."

My invention relates to the production of oximes and more particularly it relates to a process for producing oximes from primary and secondary nitroparaffins containing at least two carbon atoms in the presence of a zinc oxide-silver dichromate catalyst.

Oximes have long been prepared by the partial reduction of nitroparaffins. Hydrogenation in the presence of a catalyst is one of the ways by which this reduction can be made and such a catalytic reduction is disclosed by Grundmann in Angew. Chem., volume 62, pages 558–560 (1950). The Grundmann reference shows a reduction of nitrocyclohexane to cyclohexanone oxime using various catalysts, the best catalyst being a silver oxide, zinc oxide, chromium oxide, calcium oxide catalyst.

While a catalyst such as that described above enables production of oximes in reasonable conversions from the nitroparaffin, the results tend to be erratic and often vary widely from batch to batch. Further, the process for preparing the catalyst is a cumbersome, multi-step operation which is expensive and painstaking.

I have now discovered a new process for the production of oximes from which I am able to obtain by the reduction of nitroparaffins consistently greater yields than could heretofore be obtained. My new process is both practical and economical in that it allows the use of a new catalyst which is easily and inexpensively prepared.

According to my new process, the nitroparaffin is reduced to the corresponding oxime in the presence of a zinc oxide-silver dichromate catalyst. The nitroparaffins that can be used are the primary and secondary nitroparaffins containing at least two carbon atoms, for example, nitroethane, 1-nitropropane, 2-nitropropane, 2-nitrobutane, nitrocyclohexane, etc., and the like. Some of the oximes than I can produce are acetaldoxime, propionaldoxime, acetoxime, methylethylketoxime, cyclohexanone oxime, etc. Hydrogen is used as the reducing agent, and the reduction is accomplished in a hydrogen atmosphere under pressure. Generally it is preferable in the reaction to use a solvent. Suitable solvents include the lower alkanols such as methanol.

Temperature and pressure are influencing factors but are not critical to the process. Hydrogen pressures below 300 p.s.i. tend to slow the hydrogenation. I therefore prefer to use pressures above 300 p.s.i. generally in the range of from 500 p.s.i. to 1,500 p.s.i. The temperatures I prefer to use in the hydrogenation step of the process are from about 110° C. to about 200° C.

The zinc oxide-silver dichromate catalyst of my invention is prepared by forming an aqueous slurry of zinc oxide and silver nitrate and then mixing the said slurry with an aqueous medium containing a source of dichromate ion to precipitate the catalyst as a solid. The solid precipitate is then separated from the aqueous medium by filtration and dried to obtain the active catalyst. In an alternate procedure I can form a slurry of dichromate ions and zinc oxide and then add silver nitrate to the slurry.

Any water-soluble source of dichromate ion can be utilized in preparing the catalyst of my invention. Such suitable sources include ammonium dichromate, calcium dichromate, sodium dichromate, chromic acid, potassium dichromate, etc., and the like.

Although the final percentages of zinc oxide and silver dichromate are not critical in my catalyst, I prefer, for best possible reduction results, to utilize a catalyst containing equal amounts by weight of zinc oxide and silver dichromate.

The following examples are offered to illustrate my invention; however, I do not intend to be limited by them. Rather, I intend to include within the scope of my invention, all equivalents obvious to those skilled in the art.

*Example I*

A slurry was prepared from 17 grams of silver nitrate, 21.5 grams of zinc oxide, and 400 milliliters of water. To this slurry were added 13 grams of ammonium dichromate dissolved in 200 milliliters of water to obtain a reddish precipitate. The addition was accomplished at room temperature. The reddish precipitate was then filtered and dried at 100° C. to obtain the catalyst.

*Example II*

A slurry was prepared from 16.2 grams of calcium dichromate (in the form of the trihydrate), 21.5 grams of zinc oxide, and 350 grams of water. To the slurry were added 17 grams of silver nitrate, dissolved in 200 milliliters of water, to obtain a reddish precipitate. The addition was accomplished at room temperature. The resulting precipitate was then filtered and dried at 100° C. to obtain the catalyst.

*Example III*

A slurry was prepared from 17 grams silver nitrate, 21.5 grams zinc oxide, and 400 milliliters of water. To this slurry were added 15 grams of sodium dichromate (in the form of the dihydrate) dissolved in 200 milliliters of water to give a reddish precipitate. The addition was accomplished at room temperature. The reddish precipitate was then filtered and dried at 100° C. to obtain the catalyst.

*Example IV*

A slurry was prepared from 17 grams silver nitrate, 21.5 grams zinc oxide, and 400 milliliters of water. To the slurry were added 15 grams of potassium dichromate in 200 milliliters of water to give a reddish precipitate. The addition was accomplished at room temperature. The reddish precipitate was then filtered and dried at 100° C. to obtain the catalyst.

*Example V*

A slurry was prepared from 17 grams silver nitrate, 21.5 grams zinc oxide, and 400 milliliters of water. To this slurry were added 10 grams of chromic acid in 200 milliliters of water to give a reddish precipitate. The precipitate was then filtered and dried at 100° C. to obtain the catalyst.

*Example VI*

Catalysts prepared as described in Examples I, II, III, IV, and V were tested as follows: A 1-liter stainless steel rocking bomb was charged with 390 grams of nitrocyclohexane, 390 grams of methanol solvent, and 4 grams of a sample of catalyst prepared and treated as described in the above examples. Hydrogen under 500 p.s.i. was added and the bomb charge heated to 135° C. The hydrogen pressure was increased to 1,000 p.s.i. and the reduction continued to a hydrogen uptake of 1,000 pounds. Results are shown below.

| Catalyst | Reduction Time, Minutes | Percent Conversion of Nitrocyclohexane to Cyclohexanone Oxime |
|---|---|---|
| I | 37 | 90 |
| II | 14 | 92 |
| III | 40 | 94 |
| IV | 15 | 95 |
| V | 14 | 90 |

*Example VII*

The procedure of Example VI was carried out using the catalyst of Example I with the exception that 2-nitropropane was utilized instead of nitrocyclohexane to obtain acetoxime. Results similar to those of Example VI were obtained.

*Example VIII*

The procedure of Example VI was carried out using the catalyst of Example II with the exception that 2-nitrobutane was utilized instead of nitrocyclohexane to obtain butane oxime. Results similar to those of Example VI were obtained.

Now having described my invention, what I claim is:

1. A process for the preparation of a zinc oxide-silver dichromate catalyst which comprises forming an aqueous slurry of zinc-oxide, a source of dichromate ion, and silver nitrate to precipitate a solid catalyst material, recovering the solid material from the aqueous slurry and drying the solid material to obtain a dry solid catalyst.

2. The process of claim 1 wherein the source of dichromate ion is chromic acid.

3. The process of claim 1 wherein the source of dichromate ion is calcium dichromate.

4. The process of claim 1 wherein the source of dichromate ion is sodium dichromate.

5. The process of claim 1 wherein the source of dichromate ion is ammonium dichromate.

6. The process of claim 1 wherein the source of dichromate ion is potassium dichromate.

7. The method of claim 1 wherein said slurry includes an amount of zinc oxide, source of dichromate ion and silver nitrate sufficient to provide a catalyst containing approximately equal amounts by weight of zinc oxide and silver dichromate.

8. The method of claim 1 wherein said solid material is dried at a temperature of about 100° C.

References Cited by the Examiner

UNITED STATES PATENTS

| 1,625,929 | 4/1927 | Woodruff et al. | 252—468 X |
| 2,376,252 | 5/1945 | Hull | 252—468 X |
| 2,638,482 | 5/1953 | Grundmann | 260—566 |
| 2,711,427 | 6/1955 | Christian | 260—566 |
| 2,762,844 | 9/1956 | Kaarsemaker | 260—566 |
| 3,153,091 | 10/1964 | Chandler | 260—566 |

FOREIGN PATENTS 515,581  8/1955  Canada.

OTHER REFERENCES

Grundmann II, Angew. Chem., volume 62, pages 558–560 (1950).

BENJAMIN HENKIN, *Primary Examiner.*

MAURICE A. BRINDISI, *Examiner.*

G. T. OZAKI, *Assistant Examiner.*